United States Patent
Coates et al.

(10) Patent No.: US 9,470,807 B2
(45) Date of Patent: *Oct. 18, 2016

(54) DETECTION OF SEISMIC SIGNALS USING FIBER OPTIC DISTRIBUTED SENSORS

(71) Applicant: Schlumberger Technology Corporation, Sugar Land, TX (US)

(72) Inventors: Richard T. Coates, Katy, TX (US); Douglas E. Miller, Boston, MA (US); Arthur H. Hartog, Winchester (GB); Colin A. Wilson, Surrey (GB); Dominic Brady, Winchester (GB); Henry Menkiti, Houston, TX (US); Francois M. Auzerais, Boston, MA (US); Ian David Richard Bradford, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/073,475

(22) Filed: Nov. 6, 2013

(65) Prior Publication Data

US 2014/0064028 A1    Mar. 6, 2014

Related U.S. Application Data

(63) Continuation of application No. 12/788,270, filed on May 26, 2010, now Pat. No. 8,605,542.

(51) Int. Cl.
| | |
|---|---|
| *G01V 1/18* | (2006.01) |
| *E21B 47/01* | (2012.01) |
| *G01H 9/00* | (2006.01) |
| *G01V 1/40* | (2006.01) |

(52) U.S. Cl.
CPC ............ *G01V 1/18* (2013.01); *E21B 47/01* (2013.01); *G01H 9/004* (2013.01); *G01V 1/40* (2013.01)

(58) Field of Classification Search
CPC ............................ G01V 1/18; G01V 1/40
See application file for complete search history.

(56) References Cited

U.S. PATENT DOCUMENTS

| | | |
|---|---|---|
| 4,953,136 A | 8/1990 | Kamata et al. |
| 5,044,460 A | 9/1991 | Kamata et al. |
| 5,194,847 A | 3/1993 | Taylor et al. |

(Continued)

FOREIGN PATENT DOCUMENTS

| | | |
|---|---|---|
| WO | 2010020795 A1 | 2/2010 |
| WO | 2010053931 A1 | 5/2010 |

OTHER PUBLICATIONS

International Search Report and Written Opinion issued in PCT/US2011/033845 on Apr. 26, 2011, 8 pages.

*Primary Examiner* — Daniel Pihulic
(74) *Attorney, Agent, or Firm* — David J. Groesbeck (57) ABSTRACT

A fiber optic distributed vibration system for detecting seismic signals in an earth formation is provided. The system includes a fiber optic cable deployed in a borehole that extends into the earth formation and which is configured to react along its length to a seismic wave incident on the fiber optic cable from outside the borehole. An optical source launches an optical signal into the fiber optic cable while the seismic wave is incident thereon. A receiver detects coherent Rayleigh noise (CRN) produced in response to the optical signal. A processing circuit processes the detected CRN signal to determine characteristics of the earth formation.

22 Claims, 4 Drawing Sheets

(56) References Cited

U.S. PATENT DOCUMENTS

| | | | |
|---|---|---|---|
| 6,137,611 A | 10/2000 | Boivin et al. | |
| 6,412,353 B1 | 7/2002 | Kleven et al. | |
| 6,913,079 B2 | 7/2005 | Tubel | |
| 7,224,972 B2 | 5/2007 | Pischella | |
| 7,891,423 B2 | 2/2011 | Dykstra | |
| 7,916,576 B2 | 3/2011 | Beasley et al. | |
| 8,020,616 B2 | 9/2011 | Greenaway | |
| 8,225,867 B2 | 7/2012 | Hartog et al. | |
| 8,234,932 B2 | 8/2012 | Tips | |
| 8,245,780 B2 | 8/2012 | Fidan et al. | |
| 8,269,647 B2 | 9/2012 | Solis | |
| 8,605,542 B2 * | 12/2013 | Coates | E21B 47/01 367/25 |
| 2001/0045129 A1 | 11/2001 | Williams et al. | |
| 2003/0094281 A1 | 5/2003 | Tubel | |
| 2006/0165344 A1 | 7/2006 | Mendez et al. | |
| 2008/0316860 A1 | 12/2008 | Muyzert et al. | |
| 2009/0114386 A1 | 5/2009 | Hartog et al. | |
| 2009/0276159 A1 | 11/2009 | Strobbia | |
| 2009/0326826 A1 | 12/2009 | Hull et al. | |
| 2010/0038079 A1 | 2/2010 | Greenaway | |
| 2010/0107754 A1 | 5/2010 | Hartog et al. | |
| 2010/0200744 A1 | 8/2010 | Pearce et al. | |
| 2011/0188344 A1 | 8/2011 | Hartog et al. | |
| 2011/0292763 A1 * | 12/2011 | Coates | E21B 47/01 367/25 |
| 2012/0060615 A1 | 3/2012 | Farhadiroushan et al. | |
| 2012/0067118 A1 | 3/2012 | Hartog et al. | |
| 2012/0127459 A1 | 5/2012 | Handerek | |
| 2013/0021874 A1 * | 1/2013 | Hartog | E21B 47/101 367/31 |
| 2014/0064028 A1 * | 3/2014 | Coates | E21B 47/01 367/35 |

\* cited by examiner

DETECTION OF SEISMIC SIGNALS USING FIBER OPTIC DISTRIBUTED SENSORS

This application is a continuation application of U.S. Non-Provisional application Ser. No. 12/788,270, filed on May 26, 2010, which is incorporated herein by reference.

TECHNICAL FIELD

The present invention relates generally to borehole seismic surveying and, more particularly, to detection of seismic events using fiber optic distributed sensors.

BACKGROUND

Borehole seismic surveys have become among the most versatile of downhole measurements used in the hydrocarbon industry. Originally, borehole seismic surveys were limited to correlating time-based surface seismic images with depth-based well logs and depth-based reservoir models for the purpose of making drilling decisions. Today, however, modern borehole seismic applications extend beyond simple time-depth correlations to generate a wide variety of useful information about reservoir extent, geometry and heterogeneity, as well as fluid content and pore-pressure, rock mechanical properties, enhanced oil-recovery progress, elastic anisotropy parameters, induced fractures geometry and natural fracture orientation and intensity. More recently, borehole seismic measurements have extended beyond applications in the hydrocarbon industry to now include applications in the hydrology and subterranean carbon sequestration industries.

Regardless of the application, deployment of seismic survey tools in boreholes has been constrained by cost and physical size considerations. For instance, in the hydrocarbon production industry, borehole seismic survey tools typically have a diameter of two or more inches and, thus, may not be deployed in a borehole if either a drillstring or tubing is in place (unless detectors are placed on the drillstring before drilling is commenced). As a result, the performance of a borehole seismic survey generally entails pulling the drillstring or production tubing (if one or the other is in place), running in an array of survey tools, conducting the survey, pulling the tool array, and then replacing the drillstring or tubing (if needed). As a result, the seismic survey is costly, both in terms of rig time and, in some instances, lost production while the survey is being performed. In addition, borehole survey tools typically include both downhole sensors and electronics. The harsh downhole environment increases the complexity and cost of the sensors and electronics since they must be designed to withstand elevated temperatures and pressures for extended periods of time. Consequently, seismic survey tools generally are not considered disposable and may not be either abandoned in the borehole after use or left inactive in a borehole for extended periods (such as for time-lapse surveys) due to lost revenues that could be obtained by deploying the survey tools in other locations.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via another element"; and the term "set" is used to mean "one element" or "more than one element". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

In general, borehole seismic surveys are performed by recording seismic signals using a single sensor or an array of sensors located in a borehole that extends from the earth surface into a sub-surface formation. Depending on the particular application, seismic signals may be generated by one or more seismic sources located on the earth surface, in the borehole in which the seismic signals are detected, in an adjacent borehole, and/or in the formation surrounding the borehole. A wide variety of seismic sources may be used to generate the seismic signals. For instance, surface seismic sources may include air-guns, accelerated weight drops, vibrator trucks, and explosives. Common downhole seismic sources may include piezoelectric pulsers, orbital-, vertical- and radial-vibrators, hammers, air-guns, sparkers, implosive canisters, and explosives. In some cases, such as in microseismic or hydrofracturing monitoring applications, the seismic signals are emitted either when fractures are generated in the surrounding formation or when the rock on either side of existing fractures slip relative to one another. Depending on the particular application in which the monitoring is being performed, the seismic source may be located at a single location, a limited number of locations (e.g., arranged in a single line along the borehole or over the ground surface), or in multiple locations so as to substantially cover the entire surface of the earth in the vicinity of the borehole in which the sensors are detecting the seismic signals (e.g., arranged in multiple parallel lines, in multiple lines radiating outward from a single location, in a spiral, or in a random or pseudo-random manner).

The seismic energy generated as a result of the seismic source may be recorded by any of a variety of types of seismic sensors, such as hydrophones, geophones, accelerometers, or a combination thereof. In typical downhole applications, these types of sensors are coupled to electrical components downhole which amplify, condition (e.g., band pass) and digitize the electrical signals generated by the sensors in response to detection of a seismic event. The digitized signals may then be transmitted (e.g., via electrical wireline, mud pulse telemetry, fiber optic cable, etc.) to the surface where they are recorded, or they may be temporarily stored in a downhole storage device, such as a solid-state memory, and then later retrieved. In either configuration, the need for downhole electronics adds to the physical size, cost and complexity of the survey tool, particularly since the electronics must be able to withstand, or be protected from, elevated temperatures and pressures of the downhole environment for extended periods of time.

These constraints, when combined with limitations on the amount of power that can be delivered downhole and the amount of data that can either be stored downhole or transmitted to the surface, have also served to restrict the number of sensors that may be used in a seismic survey installation. For instance, in the past, borehole seismic survey systems have been constrained to the use of one, five or eight sensors. And, despite modern technological advances, more recent installations typically can deploy no more than one hundred sensors.

The size constraint also is a serious limitation since the seismic tool is deployed in a confined location (i.e., in a borehole). For instance, current downhole survey tools typically have a diameter of two or more inches. This size limits the manner in which the survey tool may be deployed since its relatively large diameter may preclude running the tool either with a drillstring or inside the production tubing (if one is installed) or in the annulus between the casing and the tubing or drillstring. As a result, either the drillstring or production tubing often must be removed from the borehole before the seismic survey tool may be introduced and the survey conducted. Since removal of tubing or drillstring is a time consuming and costly procedure, performing a survey in this manner is not particularly desirable. Furthermore, abandoning the survey tool in the borehole also is almost never a viable option since the survey tool itself often is quite expensive and thus is not considered to be a disposable item and its presence in the borehole after abandonment may impede further operation of the well. Yet further, leaving the tool in an inactive state in the borehole to perform time-lapse seismic surveys, for instance, also is not an attractive option due to the loss of revenue that could otherwise be realized by using the tool for surveys in other downhole locations.

Accordingly, in accordance with embodiments of the invention, seismic signals (including microseismic signals) propagating through an earth formation outside a borehole are detected using one or more fiber optic distributed vibration sensors located in the borehole. The small diameter of the optical fiber (e.g., ¼ inch or less) allows for deployment of the fiber optic distributed sensor either inside or behind production tubing or the drillstring, thus eliminating the need to either shut in the well and/or pull tubing or a drillstring before conducting a seismic survey. Further, an optical fiber seismic signal detection system does not require costly downhole electronics. Instead, the electronics for acquiring seismic data from the fiber optic sensor all may be located on the surface. Thus, only the relatively inexpensive fiber optic sensor itself is deployed downhole and, due to its non-toxic nature, may be abandoned or left inactive in the borehole after use.

Generally, to monitor seismic signals using a fiber optic distributed vibration sensor, optical pulses are launched into the fiber optic sensor and reflected or scattered light generated in response to the pulses is detected over an extended period of time. The scattered light that is generated while seismic waves originating outside the borehole are incident along the length of the fiber optic distributed sensor may provide information about characteristics of the formation surrounding the borehole, including changes in these characteristics over a period of time. Such characteristics may include reservoir extent, geometry and heterogeneity, as well as fluid content and pore pressure, rock mechanical properties, enhanced oil-recovery progress, $CO_2$ sequestration progress, elastic anisotropy parameters, induced fractures geometry and natural fracture orientation and intensity. In some embodiments, the fiber optic distributed sensor is removably coupled to surface electronics for interrogating and acquiring microseismic event data detected by the fiber optic distributed sensor. In this manner, one or more fiber optic distributed sensors may be permanently deployed in the borehole and the surface electronics moved to perform seismic signal detection using fiber optic distributed sensors installed in other locations.

In some embodiments, multiple identical optical fibers may be deployed in the borehole. In such embodiments, the optical fibers may be located at different positions within a transverse cross-section of in the borehole for the purpose of detecting the change in phase of the seismic wave as it crosses the borehole and, thus, to determine parameters relating to the wave's direction of propagation. Alternatively, multiple optical fibers may be deployed that differ in their construction, such as being made of differing materials, having different cross-sections, or having different coatings. Due to the differences in construction, the optical fibers may be sensitive to different combinations of pressure, velocity, acceleration, and/or strain. As a result, the measurements recorded from co-located positions along the length of these multiple fibers may be used to separate the values of the pressure, velocity, acceleration, and/or strain at each co-located position and, thus, to provide more detailed information regarding the characteristics and features of the surrounding formation.

In any of the embodiments described above, the one or more fiber optic distributed sensors may be located in either a simple open or cased borehole. Alternatively, the fiber optic distributed sensors may be located in the cement outside the borehole casing; inside a control line that is deployed in the borehole either outside the casing or attached to the inside of the casing; in the annulus between a production tubing and the casing; attached to the outside of the production tubing; inside a control line that is located in the annulus between the production tubing and the casing and which may be attached to the outside of the production tubing; within the production tubing or coil tubing; within the annulus between the production or coil tubing and the casing; or a combination of any of the foregoing locations.

Figure 1:
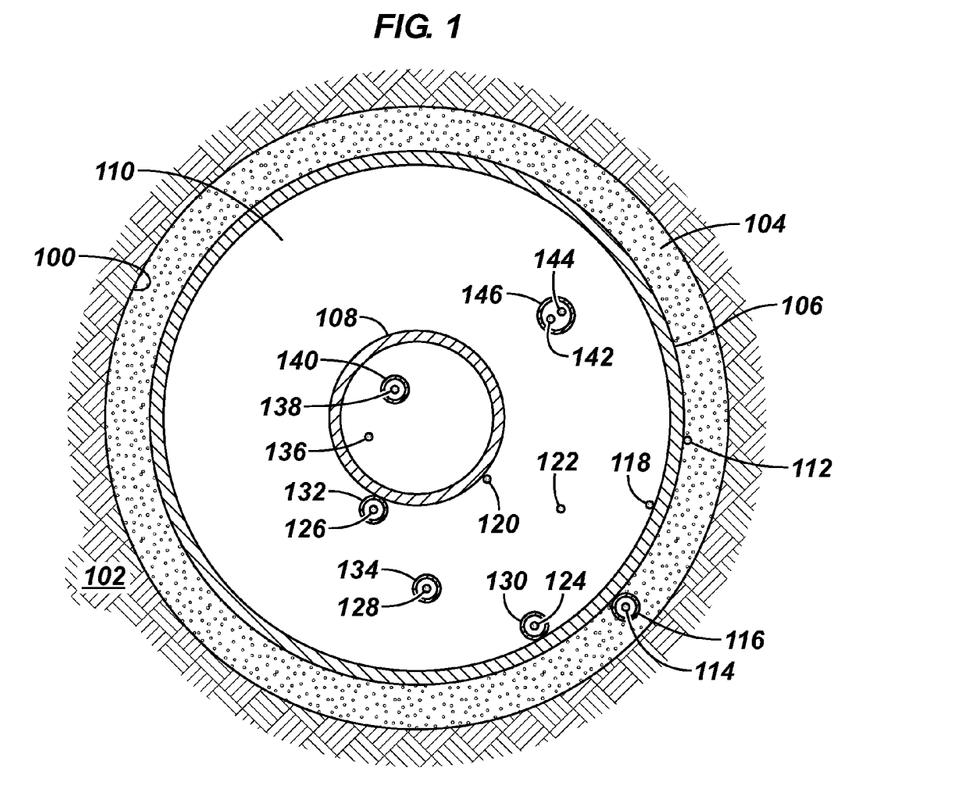
FIG. 1 is a transverse cross-section of a borehole illustrating exemplary deployment locations of fiber optic sensors, in accordance with an embodiment of the invention.

Exemplary deployment locations are illustrated in FIG. 1, which generally depicts a transverse cross-sectional view of a cemented and cased borehole 100 that has been formed in a surrounding formation 102. As shown in FIG. 1, the borehole 100 includes a cement portion 104 and a casing 106. A production tubing 108 is deployed in the borehole such that an annulus 110 is formed between the outside wall of the production tubing 108 and the casing 106. The fiber optic distributed sensors deployed in the borehole 100 may be either bare or encased along their length in a protective coating or jacket. Yet further, the optical fiber may include a coating or may be encased in a compliant material that is particularly sensitive to pressure, such as a metallized foam material or an acoustic-matching medium (e.g., a gel), to thereby enhance the sensitivity of the seismic measurement. The pressure-sensitive coating or material may be disposed uniformly along the length of the optical fiber or may be disposed at select locations along the length. Still further, a bare, coated or encased fiber may be installed inside a control line or other thin-walled tubing.

As examples, and with reference to FIG. 1, fiber 112 is located in the cement 104, while fiber 114 is located in a control line 116 attached to the outside of the casing 106. Fibers 118, 120, and 122 are located in the annulus 110 between the tubing 108 and the casing 106, with fiber 118 being attached to the inside of the casing 106 and the fiber 120 being attached to the outside of the tubing 108. Fibers 124, 126, and 128 are located inside of control lines 130, 132, and 134, respectively, with control line 130 being coupled to the inside of the casing 106 and control line 132 being coupled to the outside of the tubing 108. Fiber 136 is deployed in the production tubing 108, while fiber 138 is installed in a control line 140 that is deployed in the tubing 108. Finally, fibers 142 and 144 are both installed within a single control line 146 that is deployed in the annulus 110. It should that understood that the various deployment locations are provided as examples only and the other, fewer, or more locations may be used, including a single location or various other combinations of locations for multiple fibers.

In embodiments in which the optical fiber cable or the control line is attached to either the inside or outside of a structure (e.g., tubing, casing, etc.), the attachment may be implemented in various manners, such as magnetically, with some form of adhesive, or by cementing the fiber in place. Alternatively, in some embodiments, the optical fiber may be disposed within a helical control line which is deployed in the borehole under extension and then released so that spring forces from the helical configuration clamp the control line against the casing or borehole wall. Attaching the optical fiber or control line to the casing or the formation may serve to provide for better (i.e., stronger) detection of the seismic signals, although the other types of deployment (e.g., loosely deployed within a control line, in the annulus, in the tubing) also provide for a sufficient transfer function to detect seismic events.

In any of the embodiments described herein, the optical fiber may be either a single-mode fiber or a multi-mode fiber, depending on the particular application as well as on the particular interrogation and acquisition equipment used to collect data from the fiber optic sensor.

The fiber optic distributed sensors shown in FIG. 1 may be deployed within the borehole 100 using known methods for conveying cables into wellbores, such as a control line containing an optical fiber cable, or a coil tubing containing an optical fiber cable, or a wireline cable with integrated optical fibers, among other methods. With respect to the fiber optic distributed sensor 112 which is deployed behind the casing 106 of the borehole 100, the fiber optic cable may be deployed with (and possibly attached to) the casing 106 as it is lowered into the borehole 100. The casing 106 may be cemented in place when the gap between the borehole 100 and the casing 106 is filled with cement 104. In embodiments in which the borehole 100 is cased with casing 106 and completed with a production tubing 108, intervention-type deployment methods may be employed to deploy any of the distributed sensors 136, 138 within the production tubing 108.

Regardless of the deployment location and technique used, seismic signals (generated during a seismic survey, for instance) may be detected by any one or more of the fiber optic distributed sensors shown in FIG. 1. As an example, any of the following types of seismic surveys may be performed with one or more fiber optic distributed vibration sensors being used in place of traditional receiver arrays:

Checkshot: used to tie time-based surface seismic and depth-based logs; characterized by a single source location above a sparse spacing of receiver locations, typically in vertical wells.

Salt-Proximity Surveys: used to locate the position of a salt face or body with respect to the well; characterized by one (or a small number) of wells offset from the position vertically above the receiver array, and generally above the salt body; the high salt-sediment velocity contrast is utilized to invert the data.

Zero-Offset Vertical Seismic Profile (VSP): used for a more sophisticated tie between time-based surface seismic and depth-based logs and an image of reflectors above and below the depth of the deepest sensor; characterized by a single source location above a dense spacing (every 50-100 feet) of receiver depths typically in a vertical well.

Walkabove VSP: an extension of the Zero-Offset VSP to deviated to horizontal wells; characterized by a source moved so as to be located above each of the receiver locations in turn.

Offset VSP: used for imaging around and below the receiver array to detect, for example, faults of dip of subterranean formations; characterized by a single source location at a substantial horizontal displacement from a relatively sparse receiver array.

Multi-Offset VSP: an offset VSP expanded to include a small number of source locations.

Walkaway VSP: a further generalization of Multi-Offset VSP to include a dense array of source locations arranged in a line usually extending either side of a point directly above the source array; common uses are to study anisotropy, to calibrate amplitude variation with source-receiver offset data from surface seismic surveys and to illuminate larger subterranean volumes.

Walk-Around VSP: typically used for studying anisotropy and the orientation of naturally occurring fractures; characterized by a sparse array of sources on the surface arranged in a circles or arc of a circle centered approximately above a point vertically above the receiver array.

MultiAzimuth Walkaway VSP: a generalization of Walkaway VSP to include multiple lines of sources with each line at some angle to the others; typically the lines cross at a point above the location of the receiver array; commonly used to study seismic anisotropy effects and the distribution of natural fractures.

3DVSP: typically used to image three-dimensional volumes of the earth above, around and below the receiver array; characterized by a dense distribution of source locations covering a substantial area of the earth surface above the receivers; the distribution of source locations may be in the form of a grid of parallel lines, a spiral, or a random or pseudo-random pattern, either deliberately designed or dictated by access restrictions, for example, along pre-existing roads.

Crosswell Seismic: typically used for high-definition imaging of the space between two or a multitude of boreholes; characterized by the source being located in one borehole and the receiver array located in another borehole.

Hydrofacture Monitoring (HFM): typically used to locate the places in which the rock is splitting, or motion is occurring along existing faults and fractures during the process of hydrofracturing a well; currently this survey is characterized by a small number (typically eight) of receivers in one or more offset boreholes; however, monitoring also may be performed in the well being hydrofractured.

Microseismic Monitoring: similar to hydrofacture monitoring, but now the seismic events are caused by fluid motions and stress changes due to production and injection activities; characterized by the need for long-term deployment of receivers in one or more boreholes.

Time-Lapse Borehole Seismic: all of the borehole seismic surveys described above (with the exception of HFM and Microseismic Monitoring which are inherently concerned with dynamic processes) can be repeated after periods of years, months, weeks, days, or in some cases hours, to track changes in the fluid content or stress-state of the reservoir; collectively these surveys can be referred to as Time-Lapse Borehole Seismic surveys.

It should be understood that the foregoing surveys are provided as examples only and that the techniques and seismic monitoring systems described herein may be used to monitor seismic signals generated in other scenarios, both stimulated and naturally occurring.

Figure 2:
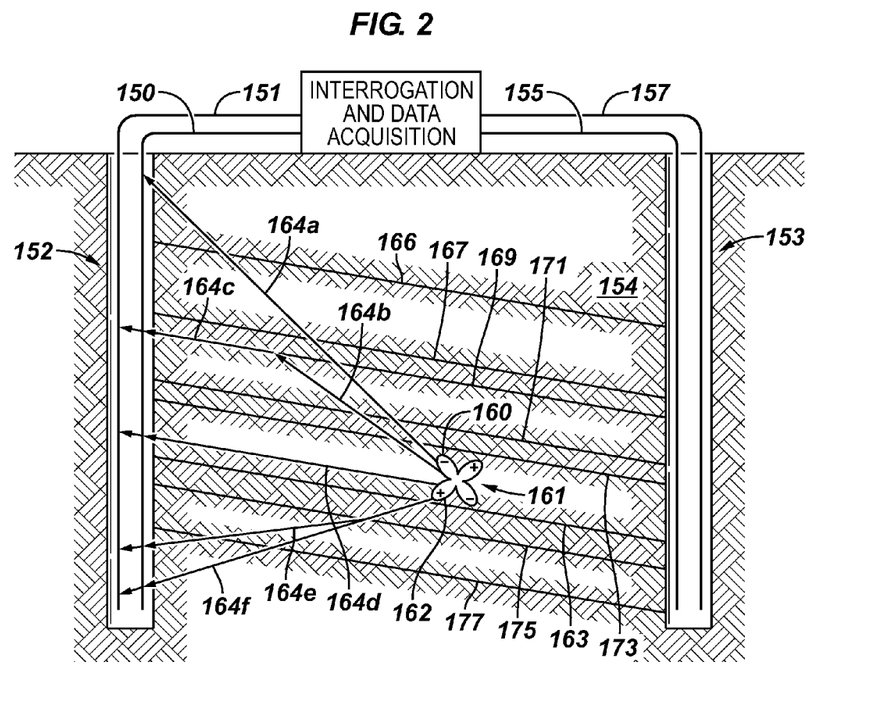
FIG. 2 shows an exemplary installation of a fiber optic vibration sensor in a borehole to monitor microseismic signals propagating through a formation, in accordance with an embodiment of the invention.

As one example, FIG. 2 illustrates an exemplary embodiment of fiber optic distributed sensors 150/151 and 155/157 deployed in boreholes 152 and 153, respectively, to monitor a hydrofracturing stimulation process that generates fractures in the surrounding earth formation 154. Here, the seismic wave incident on the fiber optic distributed sensors 150, 151, 155 and 157 from outside the boreholes 152 and 153 is detected in order to determine the nature, location and amount of fracturing. More particularly, in the field of seismology, seismic radiation caused by fault motion is described by a moment tensor. As is known in the art, the process of determining the nature and amount of fault deformation from acquired seismic data is referred to as moment tensor inversion. To invert the moment tensor, adequate sampling of the emitted seismic energy is needed. This sampling may be accomplished by deploying one or more fiber optic distributed vibration sensors in one or more boreholes that are sufficiently close to the location of the microseismic event so that the compressional and shear radiation patterns created by the generated fractures may be detected even in the presence of noise.

Figure 3:
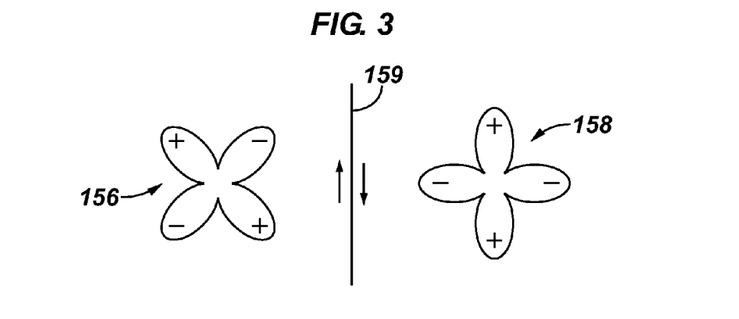
FIG. 3 shows exemplary radiation patterns of compressional and shear energy emitted during a microseismic event in an earth formation.

Referring now to FIG. 3, exemplary compressional and shear radiation patterns 156 and 158 created by right lateral shear slippage of a vertical fault 159 are shown. The pattern of at least some of the lobes of the radiation patterns 156, 158 may be detected, for instance, by the fiber optic distributed vibration sensors 150, 151, 155 and 159 that are deployed in the monitoring boreholes 152 and 153 shown in FIG. 2. In this example, the fiber optic distributed sensors 150, 151, 155 and 159 have a sufficient spatial resolution (e.g., approximately five meters) and frequency response (e.g., from approximately 5 Hz to 10 kHz) so as to provide for detection of the radiation pattern from at least some of the lobes of the pattern 161. In FIG. 2, the pattern 161 corresponds to a shear wave radiation pattern from an inclined fault 163 undergoing right lateral shear slip and the radiation pattern from two of the lobes 160, 162 may be detected by distributed sensors 150, 151 deployed in the borehole 152. Although not shown, the radiation pattern from the other lobes of the pattern 161 may be detected by the distributed sensors 155 and 157 deployed in the borehole 153. In FIG. 2, the pattern 161 and the associated ray paths 164a-f of a portion of the seismic energy emitted from the hypocenter location 161 are shown superimposed on a stratigraphic model of the formation 154 in the vicinity of the boreholes 152 and 153. In that model, line 166a represents the boundary of the formation 154, and lines 163, 167, 169, 171, 173, 175 and 177 represent various faults/features in the formation 154. The ray paths 164a-f shown in FIG. 2 are shown as typical examples only, since the paths are dependent on the seismic properties of the formation 154 which affect, for instance, the compressional and shear velocities and the attenuation of the radiated energy. These transmission effects may be quantified, either empirically or through modeling, so that the radiation patterns from the seismic waves detected by the fiber optic distributed vibration sensors 150, 151, 155, 157 may be determined.

Figure 4:
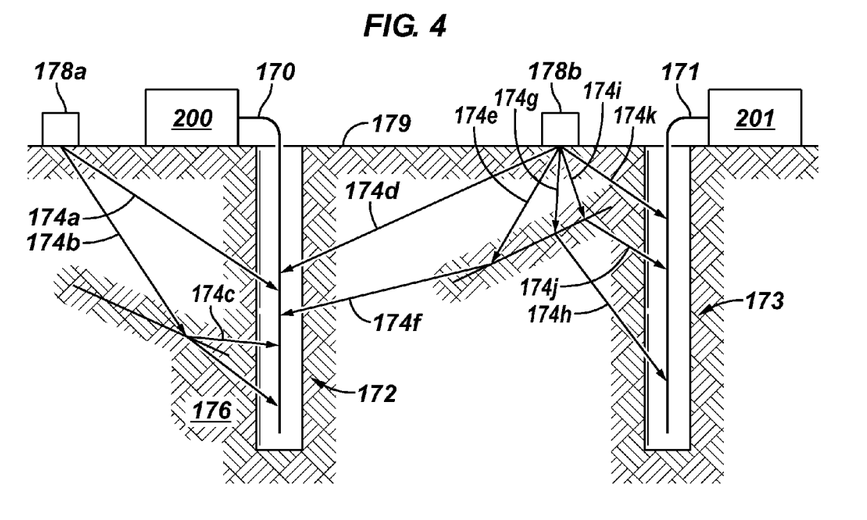
FIG. 4 shows another exemplary installation of a fiber optic vibration sensor in a borehole to monitor seismic signals propagating through a formation, in accordance with an embodiment of the invention.

FIG. 4 illustrates an exemplary embodiment in which a fiber optic distributed vibration sensor 170 is deployed in a borehole 172 and a fiber optic distributed vibration sensor 171 is deployed in a borehole 173, both of which extend into an earth formation 176 from a surface 179. Distributed sensors 170 and 171 are configured to detect seismic signals incident on the sensors 170 and 171 from outside the borehole 172. The seismic signals 174a-k in this example propagate through the formation 176 and are generated during a seismic survey using multiple seismic sources 178a-b located at the surface 179. The distributed sensor 170 is coupled to an interrogation and data acquisition system 200 that acquires and analyzes data from the sensor 170 to determine characteristic of the formation 176. Likewise, the distributed sensor 171 is coupled to an interrogation and data acquisition system 201 that acquires and analyzes data from the sensor 171.

Interrogation and data acquisition systems 200 and 201 may be separate systems as shown or may be integrated into a single system with a single optical source that generates an optical signal that may be split for launching into the various sensors 170 and 171. In some embodiments, the systems 200 and 201 (either separately or as an integrated system) may acquire the data from the sensors 170 and 171 and then transmit the acquired data to a remote location for processing to determine various parameters of interest, including parameters that are indicative of the characteristics of the formation 176 including (in some applications) the location and nature of microseismic events occurring in the formation 176. Data acquired from each of the distributed sensors 170 and 171 may be synchronized to a common time source, such as a master timing trigger used to initiate interrogation of the sensors 170, 171 or a precision timing source (e.g., a GPS source), so that the data from each of the sensors 170, 171 may be correlated when processed.

Figure 5:
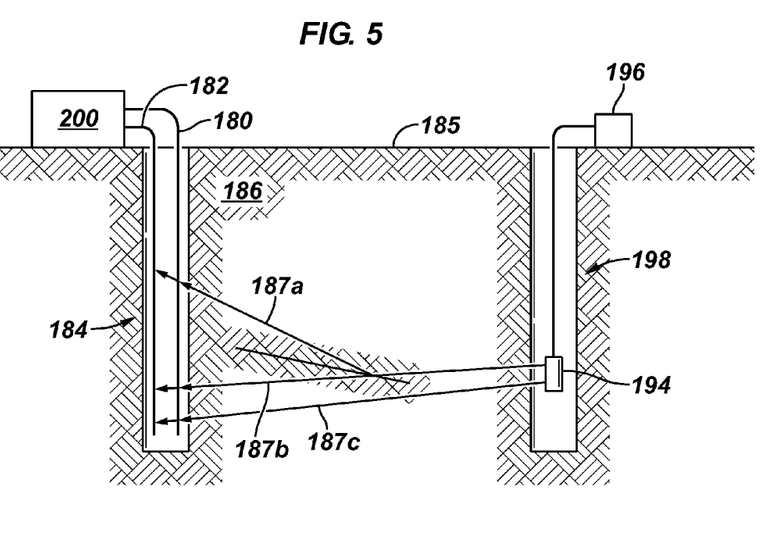
FIG. 5 shows yet another exemplary installation of multiple fiber optic vibration sensors in a borehole to monitor seismic signals propagating through a formation from a source in another borehole, in accordance with an embodiment of the invention.

FIG. 5 illustrates yet another exemplary embodiment in which fiber optic distributed vibration sensors 180 and 182 are positioned at substantially different locations in the transverse cross-section of a borehole 184 that extends from surface 185 into a formation 186. Here, the sensors 180 and 182 are of identical construction so as to detect changes in the phase of incident seismic signals 187a-c and thus provide for an estimation of their arrival direction. In this embodiment, the seismic signals propagate through the formation 186 as a result of a seismic source 194 (coupled to surface electronics 196) located in an adjacent borehole 198.

In any of the above embodiments or any other embodiment in which seismic or microseismic signals are detected using a fiber optic distributed sensor, one or more fiber optic distributed sensors may be deployed in a particular borehole. In addition, one or more fiber optic distributed sensors may be deployed in each of a plurality of boreholes that are in the vicinity of the seismic source. The data derived from the various fiber optic distributed sensors (in the same borehole and/or in multiple boreholes) may be correlated as appropriate to enhance and/or provide additional information regarding the seismic event and/or the characteristics of the earth formation.

In any of these exemplary embodiments, monitoring of the seismic signals incident on the distributed fiber optic vibration sensor from outside the borehole may be based on coherent Rayleigh backscatter in which a pulse of coherent light is launched into the optical fiber sensor and returned light is analyzed. For incoherent illumination, the returned light as a function of elapsed time since the launching of the probe pulse takes the form of a generally decaying waveform, the rate of decay being indicative of the loss in the optical fiber, with occasionally small features due to imperfections of the fiber, such as diameter variations or axial changes in the refractive index. However, with coherent illumination, the backscatter waveform is additionally modulated by a multi-path interference that occurs between the light re-radiated by each scattering element. This modulation of the normally slow backscatter signal is random (i.e., it depends on the relationship between the optical source frequency and the spatial distribution of the scatterers in each elemental section of fiber), but stable. If the fiber is disturbed by a seismic wave, for example, the modulation of the backscattered signal is varied in the vicinity of the disturbance. Such variations of the backscattered signal may be analyzed to detect events of a specified level and classified to determine the nature of the disturbance. The coherent Rayleigh backscatter is sometimes referred to as "coherent Rayleigh noise" (CRN).

Figure 7:
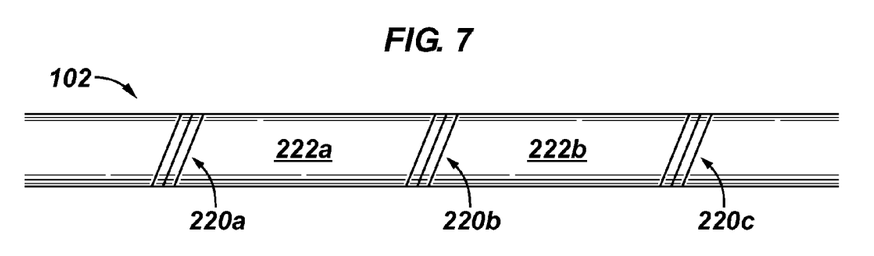
FIG. 7 is an exemplary distributed fiber optic vibration sensor including a plurality of discrete sensors, in accordance with an embodiment of the invention.

In some embodiments, rather than using a fully distributed fiber optic vibration sensor, an array of discrete reflectors or other sensors may be inserted into the fiber 102. For instance, in one embodiment shown in FIG. 7, the reflectors may be fiber Bragg reflectors 220a-c inscribed by side-illumination with a UV interference pattern. The fiber section 222a, 222b between adjacent pairs of reflectors then becomes a low reflectivity Fabry-Perot étalon and the fiber then comprises an array of such étalons, forming an interferometric sensor array that can be interrogated with a variety of methods known in the field of optical fiber sensing. While the array approach is more costly than the fully distributed one, the stronger reflectivity of the discrete reflectors, as compared for the Rayleigh backscatter, improves the signal-to-noise ratio and thus allows weaker acoustic signals to be detected. Therefore, which of these techniques is employed will depend on the particular application in which it is implemented and specifically on the anticipated acoustic signal strength as measured at the sensing optical fiber 102. Although, the terminology "fiber optic distributed vibration sensor" is used throughout this description, it is understood to also include arrays of fiber-optic vibration sensors.

Figure 6:
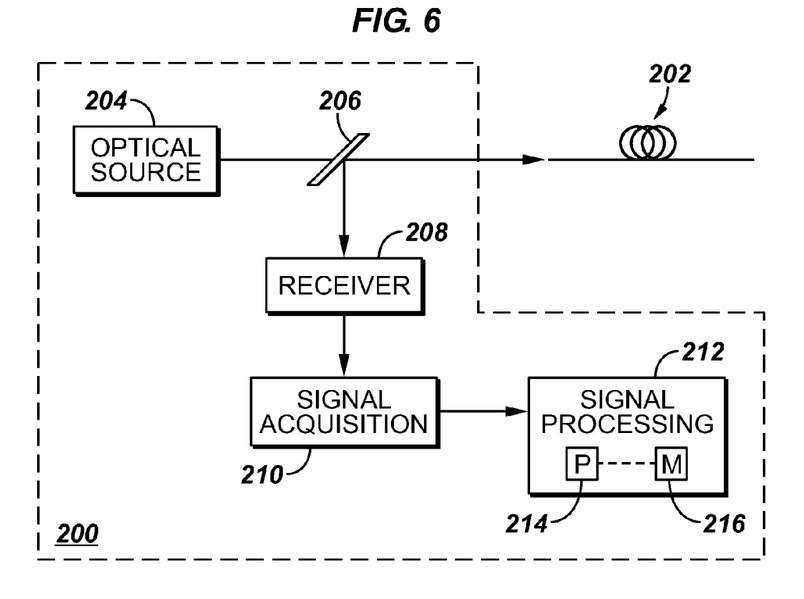
FIG. 6 show an exemplary interrogation and data acquisition system to acquire information form a fiber optic vibration sensor deployed in a borehole to monitor microseismic events, in accordance with an embodiment of the invention.

FIG. 6 illustrates an exemplary embodiment of a data acquisition and interrogation system 200 that may be used with a distributed fiber optic vibration sensor 202 for the CRN measurement. System 200 includes an optical source 204 that generates an optical signal, such as an optical pulse, for interrogating the fiber optic sensor 202, which is deployed in a borehole (not shown in FIG. 6). In some embodiments, the optical source 204 may comprise a narrowband laser (e.g., a fiber distributed feedback laser) and a modulator that selects short pulses from the output of the laser. Optionally, an optical amplifier may be used to boost the peak power of the pulses. In some embodiments, this amplifier may be placed after the modulator. The amplifier may also be followed by a filter for filtering in the frequency domain (by means of a band-pass filter) and/or in the time domain (by means of a further modulator).

The pulses emitted from the optical source 204 may be launched into the optical fiber 202 through a directional coupler 206, which separates outgoing and returning signals and directs the latter to an optical receiver 208. The directional coupler 206 may be in bulk optic form using a beamsplitter, or it may comprise a fiber-optic coupler, a circulator, or a fast switch (e.g. an electro-optic or acousto-optic switch).

The backscattered optical signal returned from the sensing fiber 202 in response to the interrogating pulses may be detected and converted to an electrical signal at the receiver 208. This electrical signal may be acquired by a signal acquisition module 210 (e.g., an analog to digital converter) and then transferred to a signal processing module 212 which may includes a processing device 214 (e.g., a microprocessor, microcontroller, digital signal processor, computer, etc.). In some embodiments, the signal processing module 212 analyzes the waveforms received to determine, at each location along the fiber 202, where the signal is changing. In addition, the signal processing module 212 may interpret this change in terms of acoustic waves modulating the backscatter return of the fiber 202. Code or instructions of software for performing the analysis and interpretation may be stored in a memory 216, which may include both durable and non-durable storage elements and may further cooperate with the processing device 214 in executing instructions of software More specifically, the backscatter signal (including the CRN) produced in response to the interrogating pulses is directed to the optical receiver 208. At any given time T (i.e., corresponding to a particular distance along the fiber 202), the electric field arriving at the receiver 208 is the vector sum of all the electric fields generated by all the scatterers within the length of fiber 202 that was occupied by the launched pulse at time T/2. The relative phase of these scatterers, dependent on the laser wavelength and distribution of the scatterers, determines whether the signals from these scatterers sum to a large absolute value (constructive interference) or essentially cancel each other out (destructive interference).

In an exemplary embodiment, the receiver 208 includes a detector that responds to optical power (as opposed to an electric field) and thus has a square-law response in terms of electric field. Thus, as the fiber 202 is disturbed by the passing seismic waves, the optical fiber 202 is strained by these waves if they couple to the fiber 202. A strain on the fiber 202 changes the relative position between the scattering centers by simple elongation of the fiber 202. The strain also changes the refractive index of the glass of the fiber 202. Both of these effects alter the relative phase of the light scattered from each scattering center. As a result, the interference signal in the disturbed region is varied by modulation of the length of the optical fiber 202, since an interference signal that may have been constructive (i.e., the scattering from each center was roughly in-phase, their electric fields sum to a large value) is now destructive (i.e., the relative phase of the scattered signals from each reflector sum to a small electric field amplitude).

The foregoing description of the detection of the CRN signals illustrates one embodiment in which the light from a single pulse undergoes direct detection. Other embodiments may launch optical pulses at two or more frequencies, the scatter from which mix at the square-law detector in receiver 208 to yield a signal at a beat frequency or frequencies. In yet other implementations, the backscatter may be passed through a compensating interferometer, which causes backscattered light to interfere with the backscatter from another section of fiber separated from the original backscattered light by a distance equal to half the path imbalance of the compensating interferometer; alternatively, the compensating interferometer may be placed in the light path prior to the light being launched into the sensing fiber. In cases where compensating interferometers are used, the optical source can be of relatively wide spectrum, since the compensating interferometer restores the mutual coherence of the optical signals mixed at the detector. A further variant is the use of coherent detection where the backscatter signal is mixed with a sample of the narrowband optical source, usually referred to as the "local oscillator." This coherent detection technique provides a low-noise method of detecting the signal since the signal reaching the detector is the product of the electric fields of the local oscillator and backscatter signals and the former may be selected to be sufficiently strong so that the resulting mixed signal dominates the noise at the receiver input.

Regardless of the particular technique implemented, the electrical signals emerging from the receiver 208 may be processed to detect the passage of the seismic wave and possibly to determine the relative time of the wave's passage at different locations along the borehole, and possibly the wave's spectral content. One way to achieve these results is to pass the signal to an analog-to-digital converter in the signal acquisition unit 210 and thereby digitize the receiver output for each probe pulse and with sufficient time resolution to be able to track the seismic wave. Signals from a set of probe pulses, but all corresponding to a single location along the borehole, may be combined into a single waveform that can be analyzed for spectral content, for example by means of a Fourier transform. The time of arrival of the seismic signal may be determined by a number of estimation techniques, for example by determining the first moment of a signal corresponding to the deviation of the signal from its quasi-static mean value. The phase velocity may be determined by comparing the time of pre-determined parts (for example the zero-crossing time) of the seismic waveform at successive locations along the borehole, or by extracting a phase estimate from the Fourier transform and determining the partial derivative of phase versus the position along the structure. The attenuation of various frequency components may be determined, for example, by comparing acoustic spectra obtained at varying distances from the source of the seismic signal.

In embodiments in which data is acquired from multiple fiber optic distributed sensors, each distributed sensor may be coupled to a dedicated interrogation and data acquisition system (e.g., system 200). In other embodiment, multiple fiber optic distributed sensors may be interrogated using a common optical pulse generator (e.g., a common optical source, modulator and amplifier) and the generated optical pulse may then be split for launching into each of the individual fibers.

The embodiments of the invention may be directed to wells for production of hydrocarbons, injection wells for improving hydrocarbon recovery, geothermal wells for energy extraction or storage, wells of $CO_2$ sequestration and wells drilled for the specific purpose of seismic monitoring. In addition, distributed fiber optic vibration sensors may be deployed in multiple wells in the vicinity of a well containing a seismic source so that multiple simultaneous crosswell seismic surveys may be conducted. Similarly, multiple nearby wells may be instrumented while conducting almost any of the borehole seismic surveys discussed herein. Still further, multiple wells surrounding a well undergoing hydrofracturing stimulation may contain fiber optic vibration sensors for detecting seismic signals generated as a result of the hydrofracturing process.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A seismic event detection system, comprising:
   a first fiber optic cable disposed in a borehole extending from an earth surface into a formation, the first fiber optic cable configured to react along its length to incident seismic signals originating inside the borehole and propagating through the formation and the borehole;
   an optical source to launch optical pulses into the first fiber optic cable while the seismic signals are incident on the first fiber optic cable; and
   a data acquisition system coupled to the first fiber optic cable to detect coherent Rayleigh noise (CRN) generated in response to the optical pulses to determine characteristics of the formation based on the detected CRN.

2. The system as recited in claim 1, further comprising:
   a second fiber optic cable disposed in the borehole and coupled to the optical source, the second fiber optic cable configured to react along its length to incident seismic signals,
   wherein the first fiber optic cable is disposed at a first location within a transverse cross-section of the borehole and the second fiber optic cable is disposed at a second location within the transverse cross-section of the borehole that is spaced apart from the first location, and
   wherein the data acquisition system detects a phase difference between seismic signals incident on the first and second fiber optic cables at each of a plurality of locations along a length of the borehole to determine characteristics of the formation.

3. The system as recited in claim 1, further comprising:
   a second fiber optic cable disposed in a second borehole, the second fiber optic cable configured to react along its length to incident seismic signals originating inside the second borehole and propagating through the formation and the borehole;
a second optical source to launch optical pulses into the second fiber optic cable while the seismic signals are incident on the second fiber optic cable; and
a data acquisition system coupled to the second fiber optic cable to detect CRN generated in response to the optical pulses,
wherein the CRN generated by the first fiber optic cable is correlated with the CRN generated by the second fiber optic cable to determine characteristics of the formation.

4. The system as recited in claim 1, wherein a hypocenter of a microseismic event is determined based on the detected CRN.

5. The system as recited in claim 1, wherein the first fiber optic cable comprises a plurality of discrete optical sensors.

6. The system as recited in claim 5, wherein the discrete optical sensors comprise fiber Bragg gratings spaced apart along the length of the first fiber optic cable.

7. The system as recited in claim 2, wherein the first fiber optic cable generates a first CRN response to pressure, velocity, acceleration and/or strain and the second fiber optic cable generates a second CRN response to the same pressure, velocity, acceleration and/or strain, and wherein the data acquisition system determines characteristics of the formation based on a difference between the first CRN response and the second CRN response.

8. The system as recited in claim 2, wherein the first and second fiber optic cables are installed in a first control line.

9. The system as recited in claim 1, wherein the first fiber optic cable comprises a pressure-sensitive material disposed along its length.

10. A method of detecting seismic signals, comprising:
deploying a first fiber optic cable in a first borehole extending from a surface into an earth formation, the first fiber optic cable configured to react along its length to incident seismic signals;
deploying a second fiber optic cable in a second borehole extending from the surface into the earth formation, the second fiber optic cable configured to react along its length to incident seismic signals;
launching optical pulses into the first and second fiber optic cables during occurrence of a seismic event in either the first or second borehole; and
detecting backscattered optical signals generated by the first and second fiber optic cables in response to the optical pulses to determine characteristics of the seismic event wherein the detecting backscattered optical signals comprises detecting coherent Rayleigh noise (CRN).

11. The method as recited in claim 10, wherein the second fiber optic cable is deployed in the same borehole as the first fiber optic, the second fiber optic cable being disposed at a location within the transverse cross-section of the same borehole that is spaced apart from a location of the first fiber optic cable.

12. The method as recited in claim 11, wherein detecting the backscattered optical signals comprises detecting a phase difference between seismic signals incident on the first and second fiber optic cables.

13. A method for conducting a seismic survey of an earth formation, comprising:
launching a first optical signal into a first fiber optic cable disposed in a borehole extending from an earth surface into the earth formation;
generating a seismic wave that propagates through the earth formation and the borehole from inside of the borehole; and
analyzing coherent Rayleigh noise (CRN) produced in response to the first optical signal while the seismic wave is incident along a length of the first fiber optic cable to determine characteristics of the earth formation.

14. The method as recited in claim 13, further comprising:
launching a second optical signal into a second fiber optic cable disposed in a borehole; and
analyzing CRN produced in response to the second optical signal while the seismic wave is incident along the length of the second fiber optic cable,
wherein characteristics of the earth formation are determined based on the CRN produced in response to the first optical signal and the CRN produced in response to the second optical signal.

15. The method as recited in claim 14, wherein the first fiber optic cable and the second fiber optic cable have a substantially identical construction and are disposed at different locations within a transverse cross-section of the same borehole, and wherein characteristics of the earth formation are determined based on a phase difference in the seismic wave incident on the first and second fiber optic cables at each of a plurality of locations along a length of the same borehole.

16. The method as recited in claim 14, wherein the first fiber optic cable is configured to react differently to pressure, velocity, acceleration and/or strain than the second fiber optic cable reacts to pressure, velocity, acceleration and/or strain.

17. A system comprising:
a first optical fiber disposed in a borehole that extends from an earth surface into an earth formation, the first optical fiber configured to react to a seismic wave incident on the first optical fiber at any of a plurality of locations along its length;
a seismic source to generate a seismic wave that originates inside the borehole;
an optical source to launch an optical signal into the first optical fiber to produce a backscattered optical signal while the seismic wave is incident on the first optical fiber;
a receiver to detect coherent Rayleigh noise (CRN) in the backscattered signal; and
a processing circuit to process the CRN to determine characteristics of the earth formation.

18. The system as recited in claim 17, further comprising a second optical fiber disposed in a borehole extending from the earth surface into the earth formation and configured to produce a second CRN signal while the seismic wave is incident at any of a plurality of locations along a length of the second optical fiber, and wherein the processing circuit further processes the second CRN signal to determine characteristics of the earth formation.

19. The system as recited in claim 18, wherein the first optical fiber and the second optical fiber are disposed in the same borehole.

20. The system as recited in claim 19, wherein the first optical fiber and the second optical fiber have a substantially identical construction and are disposed at different locations within a transverse cross-section of the same borehole, and wherein characteristics of the earth formation are determined based on a phase difference in the seismic wave incident on the first and second fiber optic cables at each of a plurality of locations along a length of the borehole.

21. The system as recited in claim 19, wherein the first optical fiber is configured to react differently to pressure, velocity, acceleration and/or strain than the second optical fiber reacts to pressure, velocity, acceleration and/or strain, and wherein characteristics of the earth formation are determined based on a difference in the reactions.

22. The system as recited in claim 17, wherein the seismic source is located in a second borehole that extends from the earth surface into the earth formation, wherein the second borehole is different than the borehole in which the first optical fiber is disposed.

* * * * *